(12) United States Patent
Geren et al.

(10) Patent No.: US 7,068,012 B1
(45) Date of Patent: *Jun. 27, 2006

(54) ATMOSPHERIC EXPLOSIVE BATTERY PROTECTION CIRCUIT HAVING A ROBUST PROTECTION SYSTEM

(75) Inventors: Michael D. Geren, Suwanee, GA (US); Jennifer K. Collier, Meath (IE); John E. Herrmann, Sugar Hill, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/169,837

(22) Filed: Jun. 29, 2005

(51) Int. Cl.
*H01M 10/46* (2006.01)
(52) U.S. Cl. ...................... 320/134; 320/136
(58) Field of Classification Search ............... 320/134, 320/136
See application file for complete search history.

(56) References Cited

U.S. PATENT DOCUMENTS

| 5,604,415 A | 2/1997 | Vashi et al. |
| 6,879,133 B1 | 4/2005 | Geren |
| 6,903,533 B1 * | 6/2005 | Geren et al. ............... 320/134 |

OTHER PUBLICATIONS

U.S. Appl. No. 10/880,209, filed Jun. 29, 2004, Geren et al.
Seiko S-8232 Series Datasheet (Attached) Specifically Fig. 6 on p. 16, no date.

* cited by examiner

*Primary Examiner*—Edward H. Tso
(74) *Attorney, Agent, or Firm*—Hisashi D. Watanabe

(57) ABSTRACT

A battery protection circuit is provided that includes current monitoring circuit. The current monitoring circuit senses current flowing from a rechargeable cell. When the current exceeds a maximum value, the current monitoring circuit actuates, whereby opening a transistor. The transistor has a resistor coupled in parallel. When the transistor opens, current is forced through the resistor coupled in parallel with the transistor, thereby limiting the current to a maximum value. When the voltage across the resistor exceeds a predetermined threshold, an overcurrent condition is simulated in the lithium ion protection IC. The overcurrent condition causes a disconnect switch to open, thereby disconnecting the cell(s) from the external terminals. The circuit additionally includes three current blocking elements coupled between charging terminals and the cells to ensure that fault conditions occurring within the charger do not adversely affect the performance of either the cells or a host electronic device.

17 Claims, 3 Drawing Sheets

ATMOSPHERIC EXPLOSIVE BATTERY PROTECTION CIRCUIT HAVING A ROBUST PROTECTION SYSTEM

BACKGROUND

1. Technical Field

This invention relates generally to protection circuits for rechargeable battery packs, and more specifically to protection circuits that enhance the reliability and performance of a battery pack in volatile environmental conditions.

2. Background Art

Portable electronic devices, like cellular telephones, pagers and two-way radios for example, derive their portability from rechargeable batteries. Such batteries allow these devices to slip the surly bonds of wall mounted power supplies and wirelessly touch the hand of the user wherever he may be.

While many people may think that a rechargeable battery is simply a cell and a plastic housing, nothing could be further from the truth. Rechargeable battery packs often include circuit boards, electronic circuitry, mechanical assemblies and electromechanical protection components. The circuits employed in rechargeable battery packs include charging circuits that control current, fuel gauging circuits, temperature measurement circuits and indicator circuits, just to name a few. Simply put, a battery pack is a complex system of components working in harmony to safely deliver power to a portable electronic device.

One of the most fundamental circuits in a battery pack is the protection circuit. Rechargeable battery performance, especially with respect to those having cells constructed of lithium-based materials, may be severely compromised if the cell within the battery pack is over or under charged. For this reason, most all battery packs today include one form of lithium ion protection IC or another.

Typical lithium ion protection ICs include voltage and current limits. As such, when the voltage across the cell in a battery pack becomes too high or too low, the lithium ion protection IC will open switches within the pack, thereby "turning off" the battery pack. Similarly, if the current flowing either into or out of the cell gets too high, the lithium ion protection IC will turn off the battery pack.

Despite these voltage and current safety mechanisms, new concerns are arising from "thermal" situations, especially in volatile environments. Standards boards in various countries are enacting strict standards to ensure that battery packs remain reliably operable where, for example, combustible gasses may be present in the atmosphere. One such standard is the Atmospheric Explosive (ATEX) standard set forth by the European Union. This stringent standard sets forth current, voltage and charging limits for rechargeable batteries that today's lithium ion protection ICs simply can not meet. For example, while a conventional lithium ion protection IC will disable charging when cells become over charged, there is an inherent propagation delay associated with this disabling action. Under certain short circuit conditions, conventional lithium ion protection ICs simply do not open fast enough to meet the ATEX requirements.

There is thus a need for an improved battery pack having a robust protection system capable of meeting the operational demands of battery packs in volatile environments.

DETAILED DESCRIPTION OF THE INVENTION

Figure 1:
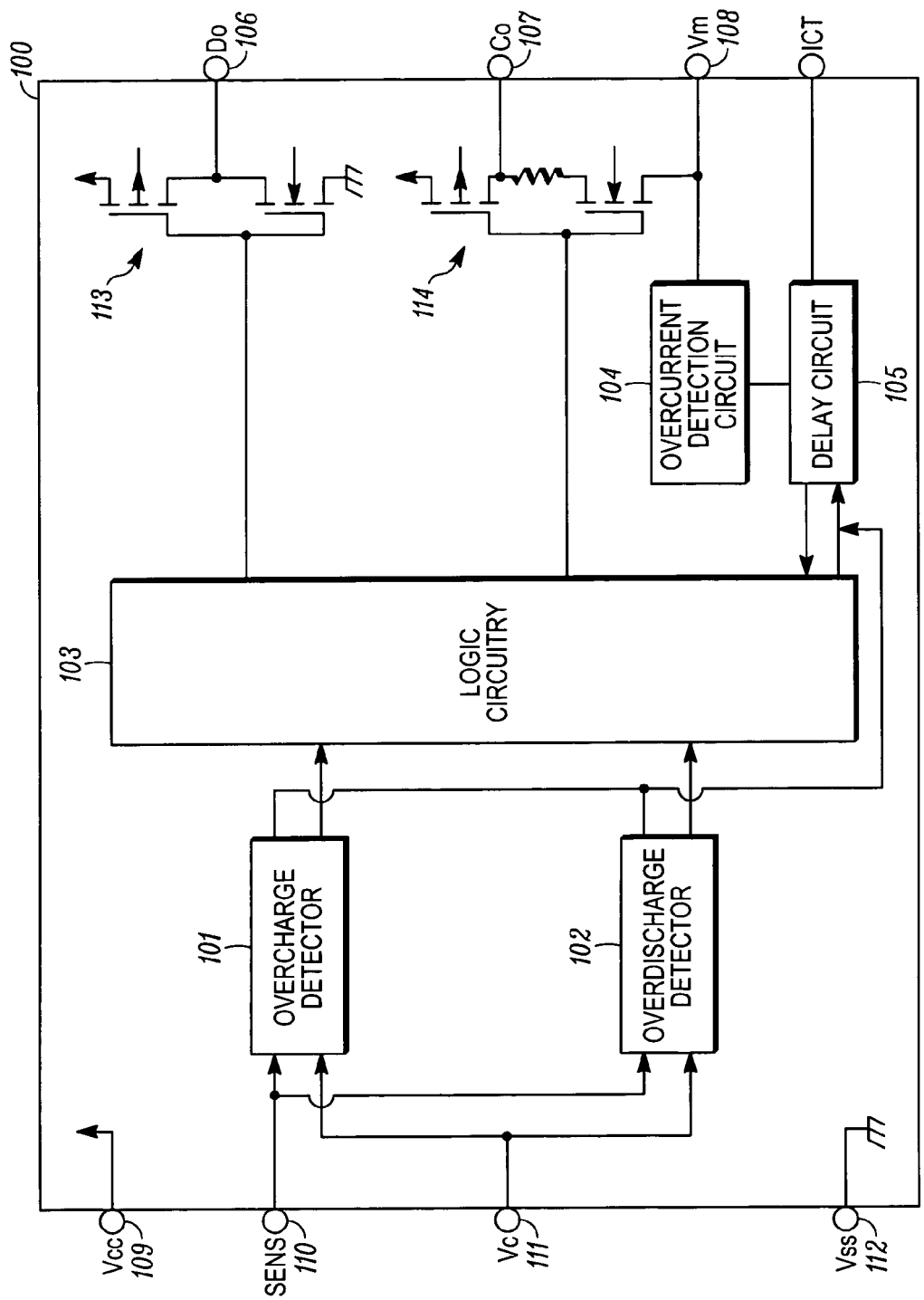
FIG. 1 illustrates a block diagram of a prior art lithium ion protection IC IC.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Commonly assigned U.S. Pat. No. 6,903,533, issued Jun. 7, 2005, entitled "Power Fault Battery Protection Circuit", filed Dec. 16, 2003, which is included herein by reference, teaches a circuit that simulates an overcurrent condition in a battery lithium ion protection IC when power being delivered to or from a rechargeable cell exceeds a predetermined threshold, like 9 watts for example. This circuit prevents current flow to or from the battery when this threshold is exceeded, with the goal of preventing the overall battery pack from overheating.

Similarly, commonly assigned U.S. Pat. No. 6,879,133, issued Apr. 12, 2005, entitled "Battery Protection Circuit, filed Mar. 26, 2004, which is included herein by reference, teaches a circuit that simulates an overcurrent condition in a battery lithium ion protection IC when any number of parameters, including power or pulsed current, exceed a predetermined threshold.

Copending, commonly assigned application Ser. No. 10/880,209, entitled "Battery Protection Circuit", filed Jun. 29, 2004, which is included herein by reference, also teaches a circuit for simulating an overcurrent condition in a battery lithium ion protection IC. The overcurrent condition of the '209 invention is simulated when the current flowing to or from a rechargeable cell in the battery pack exceeds a predetermined current threshold. That invention includes a conventional lithium ion protection IC, but also includes an additional safety circuitry that limits current to a maximum value. While the conventional circuit is only capable of stopping current, the additional safety circuitry includes an additional current limiting function.

This invention is an extension and further development of the '209 application. It includes not only both a lithium ion protection IC in which an overcurrent condition is simulated when the current flowing to or from the cells exceeds a predetermined current threshold and additional safety circuitry to limit current to a maximum value, but also additional safety circuitry that ensures that charging terminals on the battery pack are isolated from both the cells and the radio terminals under certain conditions.

The present invention thus includes a battery protection circuit that has at least one rechargeable cell and a safety circuit coupled to the at least one rechargeable cell. The safety circuit includes both a voltage monitoring circuit and a current monitoring circuit. There is at least one disconnect element coupled serially with the at least one rechargeable cell, as well as a current monitoring circuit and a circuit for simulating an overcurrent condition within the safety circuit when the current monitoring circuit determines that the current flowing from the cells exceeds a predetermined current threshold.

Additionally, to ensure that current stays below a predetermined threshold, the circuit includes a transistor coupled serially with the at least one rechargeable cell and a resistor having an impedance less than 100 Ohms coupled in parallel with the transistor. When the current flowing from the cells exceeds the predetermined current threshold, the current monitoring circuit causes the transistor to enter a high-impedance state.

To add protection to the terminals of the battery pack that couple to a charger, the circuit includes a pair of current blocking elements coupled serially between the charger terminal and the cells. When the battery protection circuit is coupled to a charger, the pair of current blocking elements is in a conducting state. When the battery protection circuit is decoupled from the charger, the pair of current blocking elements enters a non-conducting state. To further protect the cells from improperly charging, the circuit includes yet a third current blocking element coupled serially between the charge terminal and the at least one rechargeable cell.

Prior to understanding the protection circuit, a brief overview of prior art battery lithium ion protection ICs is warranted. As used herein, a "lithium ion protection IC" is any circuit capable of monitoring the voltage across at least one rechargeable cell, in addition to being capable of monitoring the current flowing through the cell or cells. One example of such a circuit is the S8232 series of lithium ion protection ICs manufactured by Seiko Instruments, Inc. For discussion and exemplary purposes, such a circuit will be discussed herein. It will be clear to those of ordinary skill in the art who have the benefit of this disclosure, however, that the invention is not so limited. Discrete circuits, application specific circuits and lithium ion protection ICs manufactured by other companies, including Ricoh and Mitsumi for example, may be equally substituted for the Seiko circuit.

By way of background, referring now to FIG. 1, illustrated therein is a block diagram of an S-8232 lithium ion protection IC 100. The S-8232 lithium ion protection IC is designed to be used with two, serial, lithium-based cells. Again, it will be clear to those of ordinary skill in the art with the benefit of this disclosure that the invention is not so limited. The over current simulating circuit discussed herein may be equally applied to any combination of serial or parallel cells.

The lithium ion protection IC 100 may be as simple as a single integrated circuit (IC) that provides a means for monitoring of cell voltage and current, and thereby controls the charging and discharging of the cells within a battery pack. Discrete equivalents of the IC may also be substituted. The lithium ion protection IC 100 includes an overcharge detector 101 that monitors the voltages across the corresponding cells. The overcharge detector 101 compares these voltages to a predetermined voltage threshold. When the cell voltage exceeds this threshold, the overcharge detector 101, via internal logic circuitry 103, causes a push-pull output stage 114 to actuate the charge pin 107. When the charge pin 107 is coupled to a disconnect means, like a transistor acting as a switch in its non-linear region, actuation will prevent any further charging of the cells.

Similarly, the lithium ion protection IC includes an overdischarge detector 102 that ensures that the voltage across the cells does not fall below a predetermined threshold. If it does, the overdischarge detector 102 causes an output stage 113 to actuate the discharge pin 106. When the discharge pin 106 is coupled to a disconnect means, like a serial transistor, actuation prevents any further discharge of the cells.

Cell current is monitored by way of an overcurrent detection pin 108 coupled to an overcurrent detection circuit 104. The overcurrent detection pin 108 senses the voltage between the Vss pin 112 and the overcurrent detection pin 108. When this voltage exceeds a predetermined threshold, as will be explained in more detail later, the overcurrent circuit 104 causes the discharging pin 106 to actuate, thereby stopping the flow of current in the discharge direction. In some situations, with some lithium ion protection ICs, the charging pin 107 may also actuate. When the load is removed, as evidenced by an impedance greater than 200 MΩ appearing between the Sens pin 110 and the overcurrent pin 108, the lithium ion protection IC 100 resets, thereby deactuating the discharge pin 106.

Other components of the lithium ion protection IC 100 include a Vcc pin 109, a center tap pin 111, and a Vss pin 112, that monitor the voltage at the cathode, between, and at the anode of serial cells, respectively. Additionally, a delay circuit 105 provides some hysteresis and transient immunity.

Figure 2:
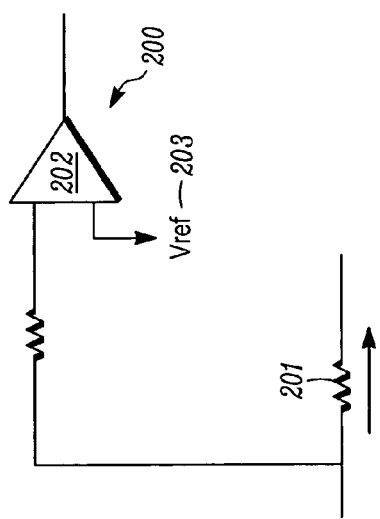
FIG. 2 illustrates current detector in accordance with the invention.

Turning now to FIG. 2, illustrated therein is a current detector 200 in accordance with the invention. While it will be clear to those of ordinary skill in the art having the benefit of this disclosure that the invention is not so limited, in one embodiment, the current detector 200 includes a comparator 202, a voltage reference 203 and a current sense resistor 201. When current flowing through the current sense resistor causes a voltage across the resistor to exceed that of the reference voltage 203, the output of the comparator 202 changes state. Where, as will seen below, the output of the comparator 202 is coupled to a current blocking device, like a metal oxide semiconductor field effect transistor (MOSFET) for example, the toggling output may be used to cause the MOSFET to enter a high impedance state, thereby blocking current.

Figure 3:
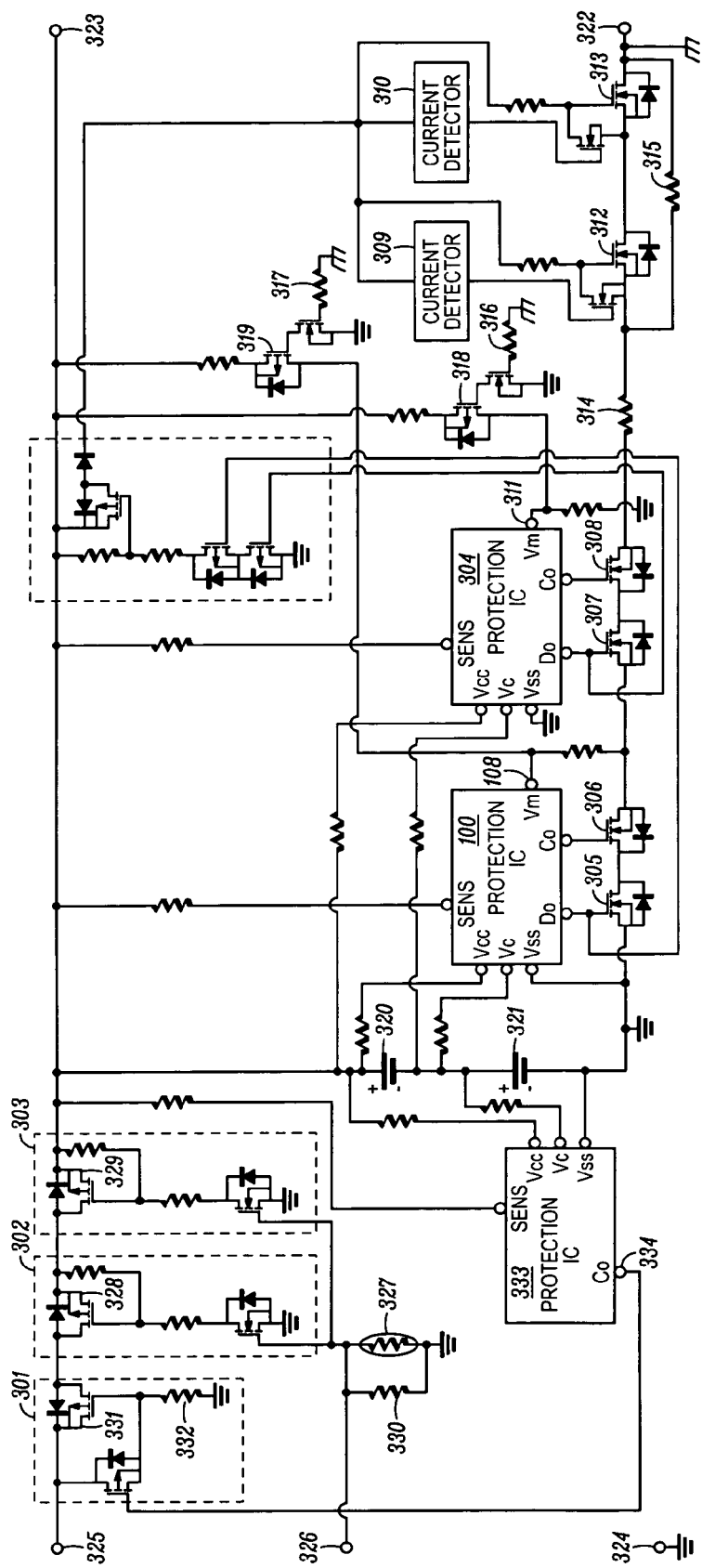
FIG. 3 illustrates one embodiment of a protection system circuit in accordance with the invention.

Turning now to FIG. 3, illustrated therein is a battery protection circuit having redundant lithium ion protection ICs 100,304. The first lithium ion protection IC 100 is coupled to a charge 306 and discharge 305 transistor, while the second lithium ion protection IC 304 is coupled to a second charge 308 and discharge 307 transistor. The duplicity of lithium ion protection ICs 100,304 offers added reliability, in that if either one or the other of the lithium ion protection ICs fails, the remaining one will offer charge protection.

Corresponding with the plurality of lithium ion protection ICs 100,304 is a first 309 and second 310 current monitoring circuits. One example of such a current monitoring circuit was illustrated as circuit 200 in FIG. 2, where each current monitoring circuit 309,310 comprises a comparator and voltage reference. Each current monitoring circuit 309,310 is coupled to a corresponding current blocking element 312,313, which are shown here as MOSFETs.

When the current flowing through the current sense resistor 314 exceeds a predetermined threshold, like 1.1 Amps for example, the current detectors 309,310 actuate, causing the pair of current blocking elements 312,313 to enter a high impedance state. When this occurs, current formerly flowing through the pair of current blocking elements 312,313 is forced through bypass resistor 315.

This bypass of current causes a voltage to be developed across the series resistors 314,315, which are in parallel with drive resistors 316,317. When sufficient voltage has developed across drive resistors 316,317, overcurrent simulation transistors 318,319 are actuated, thereby sourcing current into the Vm pins 108,311 of the lithium ion protection ICs 100,304. This sourcing of current causes an overcurrent situation to be simulated in the lithium ion protection ICs 100,304, which, in turn, after a delay inherent to the lithium ion protection ICs causes the lithium ion protection ICs 100,304 to open the series MOSFETS 305, 307 to which they are connected, thereby preventing any current from flowing out of the cells 320,321. As such, the cells 320,321 are effectively disconnected from the radio terminals 322, 323 as a result of current exceeding the predetermined threshold.

While the cells 320,321 are isolated from the radio terminals 322,323 under certain safety conditions, note that some battery packs include not only radio terminals 322, 323, but charging terminals 324,325 as well. To protect both the cells 320,321 and the radio from fault conditions that may occur due to a charger, this invention includes three current blocking circuits 301,302,303 to further enhance the reliability of the overall system.

In one preferred embodiment, the battery pack includes a temperature detecting terminal 326. When the battery pack is coupled to a charger, the charger reads the temperature of the battery pack by coupling a pull up resistor to the temperature detecting terminal 326. The pull up resistor causes a voltage to appear at the temperature detecting terminal 326 due to the voltage divider created by the pull up resistor and a thermistor 327 disposed within the battery pack.

As it is generally desirable to disallow discharging of the cells 320,321 through the charger contacts 324,325 when a charger is not connected, the present invention includes a pair of current blocking elements 328,329 coupled serially between the charger terminal 325 and the cells 320,321. These current blocking elements 328,329, illustrated here as MOSFETs, are coupled to the temperature detecting terminal 326. When a voltage is present at the temperature detecting terminal 326, i.e. when the battery pack is coupled to a charger, the pair of current blocking elements 328,329 enters a conducting state. When voltage is removed from the temperature detecting terminal 326, a pull down resistor 330 coupled to the gates of the current blocking elements 328, 329 causes the current blocking elements 328,329 to enter a high impedance state. Note that the thermistor 327 functions as such a pull down resistor, and would itself cause the current blocking elements 328,329 to enter the high impedance state. However, in one preferred embodiment, a parallel pull down resistor 330, which is substantially higher in impedance than the thermistor 327, is employed in the event the thermistor fails in an open state. As such, the charger terminals 325,324 are coupled to the cells 320,321 only when the battery pack is coupled to a charger.

As yet another level of protection, a third current blocking element 331, shown here as a p-channel MOSFET, is coupled serially between the charging terminal 325 and the cells 320,321. A pull down resistor 332 ensures that the third current blocking element 331 turns on when a positive voltage is present at its source.

Once this occurs, third current blocking element 331 stays in a conducting state until one of two events occurs: The first event is where the charger is removed from terminal 325. The second occurs where a third lithium ion protection IC 333, which monitors the voltages of the cells 320,321, determines that either or both cells 320,321 have entered an overcharged condition. At such a point, it is desirable to discontinue charging. This is done with the overcharge pin 334 of the third lithium ion protection IC 333, which actuates the third current blocking element 331, causing it to enter a high impedance state. The circuit of FIG. 3 offers a highly reliable battery circuit, in that it includes a multiplicity of redundant safety systems that ensures the components within the battery will not become overheated, nor will the cells become overcharged during operation due to excessive currents.

To recap, this invention includes the following safety systems: A pair of lithium ion protection ICs that monitor the voltages of the rechargeable cells. When the cells become either overcharged or overdischarged, the lithium ion protection ICs open serial transistors to disconnect the cells from the radio terminals.

Next, a pair of current detecting circuits monitor current flowing from the rechargeable cells. When that current exceeds a predetermined threshold, the current detectors actuate a pair of transistors, thereby forcing current to flow through a bypass resistor. When the voltage across this bypass resistor and the current sense resistor exceed a threshold, an overcurrent condition is simulated in the pair of lithium ion protection ICs.

To protect the cells from fault conditions that may occur in a charger, three redundant systems are disposed between the cells and the charger terminals. First, a pair of current blocking elements, which are coupled to a temperature detecting terminal, stay in a high impedance state until a voltage is present at the temperature detecting terminal. When this occurs, the pair of current blocking elements enters a conducting state.

Next, a third current blocking element is coupled between the charging terminals and the cells. This current blocking element, which may be a p-channel MOSFET, stays in a high impedance state until a charger is connected. When the charger is connected, the third current blocking element enters a conducting state until either the charger is removed or a third lithium ion protection IC determines that the cells have become overcharged.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment of the invention is a rechargeable battery pack, the invention is not so limited. It may be applied to any power source, including power supplies, fuel cells, solar cells and the like. Additionally, it may be incorporated into the host device as well as within the battery pack.

What is claimed is:

1. A battery protection circuit, comprising:
   a. at least one rechargeable cell;
   b. a lithium ion protection IC coupled to the at least one rechargeable cell, the lithium ion protection IC comprising a voltage monitoring circuit and a current monitoring circuit;
   c. at least one disconnect element coupled serially with the at least one rechargeable cell;
   d. a current monitoring circuit;
   e. a circuit for simulating an overcurrent condition within the lithium ion protection IC when the current monitoring circuit determines that the current flowing from the at least one rechargeable cell exceeds a predetermined current threshold;
   f. a transistor coupled serially with the at least one rechargeable cell;
   g. a resistor having an impedance less than 100 Ohms coupled in parallel with the transistor, wherein when the current flowing from the at least one rechargeable cell exceeds the predetermined current threshold, the current monitoring circuit causes the transistor to enter a high-impedance state;

h. a pair of current blocking elements coupled serially between a charger terminal and the at least one rechargeable cell, wherein the pair of current blocking elements are in a conducting state when the battery protection circuit is coupled to a charger, further wherein the pair of current blocking elements is in a non-conducting state when the battery protection circuit is not coupled to the charger; and i. at least a third current blocking element coupled serially between the charge terminal and the at least one rechargeable cell.

2. The circuit of claim 1, wherein the pair of current blocking elements are coupled to a temperature detecting terminal.

3. The circuit of claim 2, wherein when a positive voltage is applied to the temperature detecting terminal, the pair of current blocking elements enters a conducting state.

4. The circuit of claim 3, further comprising a pull down resistor coupled to a gate of each of the pair of current blocking elements such that when no voltage is present on the temperature detecting terminal, the pair of current blocking elements is in a non-conducting state.

5. The circuit of claim 1, wherein the at least a third current blocking element comprises a p-channel metal oxide semiconductor field effect transistor.

6. The circuit of claim 5, further comprising a pull down resistor coupled to a gate of the at least a third current blocking element.

7. The circuit of claim 6, wherein when a voltage is present at a source terminal of the at least a third current blocking element, the at least a third current blocking element enters a conducting state.

8. The circuit of claim 7, wherein the current monitoring circuit comprises:
  a. a comparator having at least a pair of inputs, wherein a voltage proportional to the current flowing from the at least one rechargeable cell is coupled to a first input; and
  b. a reference voltage coupled to a second input.

9. A rechargeable battery pack comprising the circuit of claim 1.

10. A battery protection circuit having an current monitoring circuit, wherein the current monitoring circuit determines when a current exceeds a predetermined threshold, comprising:
  a. at least one rechargeable cell;
  b. at least one lithium ion protection IC coupled to the at least one rechargeable cell;
  c. at least one switch coupled serially with the at least one rechargeable cell;
  d. at least one circuit for simulating an overcurrent condition within the lithium ion protection IC when the current monitoring circuit determines that the current exceeds the predetermined threshold;
  e. a transistor coupled serially with the at least one rechargeable cell; and
  f. a resistor having an impedance less than 100 Ohms coupled in parallel with the transistor, wherein when the current exceeds a predetermined current threshold, the current monitoring circuit causes the transistor to enter a high-impedance state;
  g. a resistor having an impedance less than 100 Ohms coupled in parallel with the transistor, wherein when the current flowing from the at least one rechargeable cell exceeds the predetermined current threshold, the current monitoring circuit causes the transistor to enter a high-impedance state;
  h. a pair of current blocking elements coupled serially between a charger terminal and the at least one rechargeable cell, wherein the pair of current blocking elements are in a conducting state when the battery protection circuit is coupled to a charger, further wherein the pair of current blocking elements is in a non-conducting state when the battery protection circuit is not coupled to the charger; and
  i. at least a third current blocking element coupled serially between the charge terminal and the at least one rechargeable cell.

11. The circuit of claim 10, wherein the current monitoring circuit comprises:
  a. an impedance for sensing the current flowing through the at least one rechargeable cell; and
  b. a comparator, wherein the comparator determines whether the current exceeds the predetermined threshold.

12. The circuit of claim 1, wherein the pair of current blocking elements are coupled to a temperature detecting terminal.

13. The circuit of claim 2, wherein when a positive voltage is applied to the temperature detecting terminal, the pair of current blocking elements enters a conducting state.

14. The circuit of claim 3, further comprising a pull down resistor coupled to a gate of each of the pair of current blocking elements such that when no voltage is present on the temperature detecting terminal, the pair of current blocking elements is in a non-conducting state.

15. The circuit of claim 1, wherein the at least a third current blocking element comprises a p-channel metal oxide semiconductor field effect transistor.

16. The circuit of claim 5, further comprising a pull down resistor coupled to a gate of the at least a third current blocking element.

17. The circuit of claim 6, wherein when a voltage is present at a source terminal of the at least a third current blocking element, the at least a third current blocking element enters a conducting state.

* * * * *